United States Patent
Combellas et al.

(10) Patent No.: US 10,114,665 B2
(45) Date of Patent: Oct. 30, 2018

(54) COMMUNICATION NODE UPGRADE SYSTEM AND METHOD FOR A COMMUNICATION NETWORK

(71) Applicant: Level 3 Communications, LLC, Broomfield, CO (US)

(72) Inventors: Claudia M. Combellas, Centennial, CO (US); Dana A. Johnston, Littleton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 14/944,731

(22) Filed: Nov. 18, 2015

(65) Prior Publication Data

US 2017/0139727 A1    May 18, 2017

(51) Int. Cl.
*G06F 9/455* (2018.01)
*G06F 8/65* (2018.01)
*H04L 12/24* (2006.01)

(52) U.S. Cl.
CPC ............ *G06F 9/45533* (2013.01); *G06F 8/65* (2013.01); *G06F 9/45558* (2013.01); *H04L 41/082* (2013.01); *H04L 41/0846* (2013.01); *H04L 41/12* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | |
|---|---|---|
| 2002/0176131 A1 | 11/2002 | Walters et al. |
| 2003/0187915 A1 | 10/2003 | Sun et al. |
| 2012/0102482 A1 | 4/2012 | Wu et al. |
| 2013/0055247 A1 | 2/2013 | Hiltgen et al. |
| 2013/0346617 A1 | 12/2013 | Hotes et al. |
| 2014/0075506 A1 | 3/2014 | Davis et al. |
| 2014/0101652 A1 | 4/2014 | Kamble et al. |
| 2014/0304698 A1 | 10/2014 | Chigurapati et al. |

OTHER PUBLICATIONS

International Search Report dated Oct. 31, 2016, Int'l Appl. No. PCT/US16/046854, Int'l Filing Date Aug. 12, 2016; 3 pgs.
Written Opinion of the International Searching Authority dated Oct. 31, 2016, Int'l Appl. No. PCT/US16/046854, Int=l Filing Date Aug. 12, 2016; 8 pgs.
International Preliminary Report on Patentability dated May 22, 2018, Int'l Appl. No. PCT/US16/46854, Int'l Filing Date Aug. 12, 2016; 10 pgs.

*Primary Examiner* — Gregory A Kessler (57) ABSTRACT

According to one embodiment of the present disclosure, a communication node upgrade system includes a computer-based set of instructions that are executed to identify an existing virtual machine (VM) to be upgraded, obtain upgraded software for the existing VM, create a new VM in a virtualized computing environment using the upgraded software, and copy configuration information from the existing VM to the new VM. Thereafter, the operation of the existing VM may be replaced with the new VM in the communication network. The existing VM comprising at least one communication node that provides one or more communication services for a communication network in which the existing VM is executed in a virtualized computing environment, and the configuration information includes information associated with configuration of the existing VM to provide the communication services by the existing VM.

20 Claims, 5 Drawing Sheets

COMMUNICATION NODE UPGRADE SYSTEM AND METHOD FOR A COMMUNICATION NETWORK

TECHNICAL FIELD

Aspects of the present disclosure relate to communication networks and, in particular, to a communication node upgrade system and method for a communication network.

BACKGROUND

Communication networks generally include multiple communication nodes that are coupled together using one or more links, which may include for example, wired and/or wireless communication links. Each communication node may manage the operation of relatively large numbers of communication services that may differ in many aspects, such as the type of service provided (e.g., voice communication path, data communication path, multimedia path, etc.) as well as how those paths are routed through the communication network. Due to the relatively complex nature of currently available communication networks, computer-based systems may be used to implement the functions provided by these computing nodes. These computer-based systems are software driven and thus often require periodic maintenance procedures, such as software upgrades, to ensure their continued proper operation. It is with these issues in mind, among others, that various aspects of the present disclosure have been developed.

SUMMARY

According to one embodiment of the present disclosure, a communication node upgrade system includes a computer-based set of instructions that are executed to identify an existing virtual machine (VM) to be upgraded, obtain upgraded software for the existing VM, create a new VM in a virtualized computing environment using the upgraded software, and copy configuration information from the existing VM to the new VM. Thereafter, the operation of the existing VM may be replaced with the new VM in the communication network. The existing VM comprising at least one communication node that provides one or more communication services for a communication network in which the existing VM is executed in a virtualized computing environment, and the configuration information includes information associated with configuration of the existing VM to provide the communication services by the existing VM.

BRIEF DESCRIPTION OF THE DRAWINGS

The foregoing and other objects, features and advantages of the disclosure will be apparent from the following description of particular embodiments of the disclosure, as illustrated in the accompanying drawings. The drawings are not necessarily to scale and often may provide simplified views of various features with emphasis instead being placed upon illustrating the principles of the disclosure.

DETAILED DESCRIPTION

Aspects of a communication node upgrade system and method described herein provides a tool for upgrading the communication nodes of a communication network in a manner that may reduce an amount of time that the communication nodes is out of service. Features of the present disclosure are provided by communication nodes that are implemented on virtual machines (VMs) of a virtualized computing environment in which a new VM may be instantiated, installed with upgraded software, and configured with the configuration settings of the existing VM while the existing VM remains in service. After configuration of the new VM is completed, communication services may be gracefully migrated to the new VM, thus minimizing any impact that the software upgrade may have otherwise caused to the communication node and/or the communication network in which it is configured.

Generally speaking, virtualized computing environments are provided by one or more physical hosts (e.g., a stand-alone computing device, multiple blades implemented in a blade array, etc.) that may each execute one or more virtual machines (VMs). Each VM typically includes an operating system and is implemented in a manner to generally emulate the operations of a stand-alone computing device, such as a physical host. VMs may provide certain advantages over that of their physical host counterparts in that their operation may be abstracted from the underlying physical structure that supports their operation.

The size and complexity of modern day communication networks have taken advantage of computer-based systems, which are well adapted to frequent modifications in their behavior via the use of various software components. For example, currently implemented communication networks often need to update the operation of the communication nodes in their network due to ever-changing communication standards that govern their operation, such as those promulgated by the Institute of Electrical and Electronics Engineers (IEEE), the International Organization for Standardization (ISO), the European Telecommunications Standards Institute (ETSI), and the like. Similarly, customer requirements, patches, security upgrades, any number of other frequent changes are achieved through updating nodes. Communication nodes implemented on computer-based systems are well suited to such ongoing changes by implementing ongoing software upgrades that implement the new behavior promulgated by such changes.

Nevertheless, these frequent, ongoing software upgrades often causes an undue burden for communication network managers. For example, from a business perspective, it is often beneficial to operate the communication nodes of a communication network at the highest capacity level that is reasonably possible. However, when a software upgrade is to be performed on a given node, that node is typically removed from service and all communication traffic migrated to other nodes during the upgrade. Conventional solutions to this problem have involved implementing mirror nodes or one-for-one redundancy on which communication services may be otherwise provided by the communication node being upgraded. But this arrangement, in many cases, has been proven to be cost prohibitive and time consuming.

Figure 1:
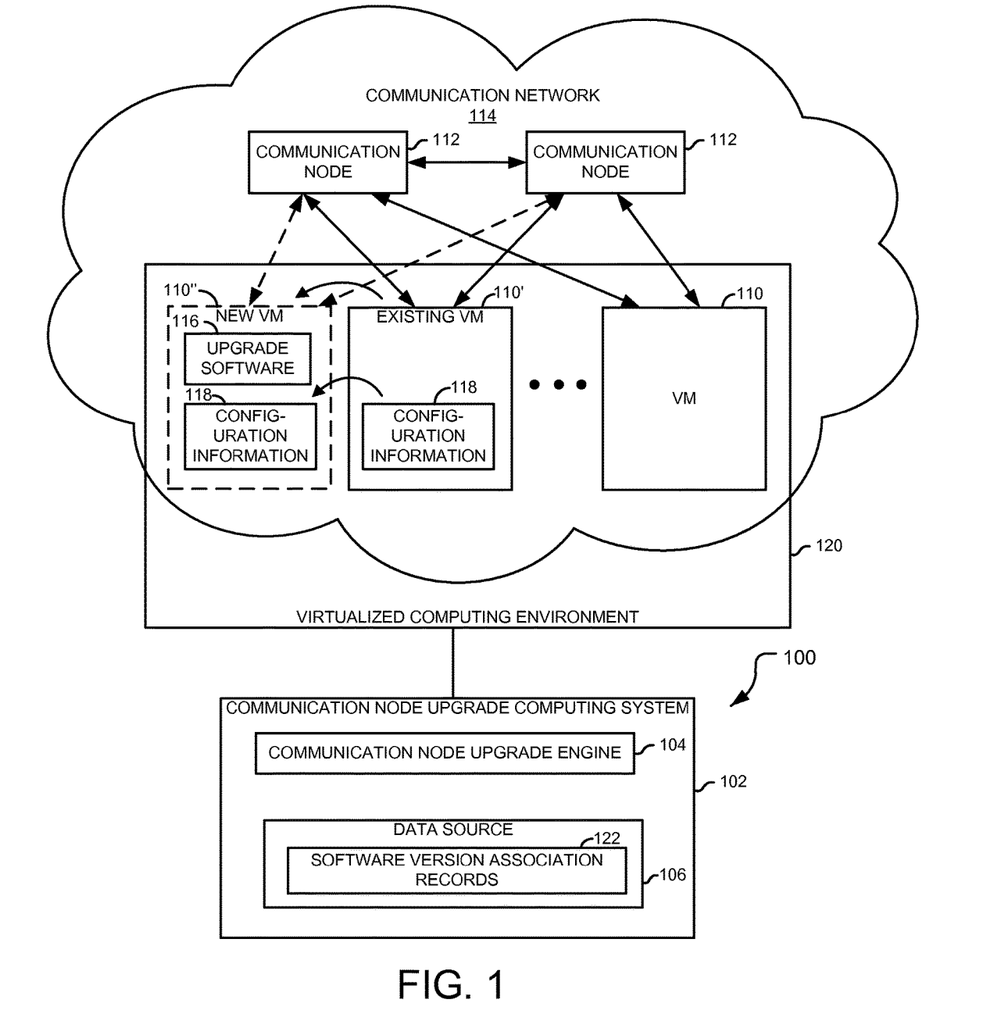
FIG. 1 is a block diagram of an example communication node upgrade system according to one embodiment of the present disclosure.

FIG. 1 depicts an example communication node upgrade system 100 that may be used to upgrade the communication nodes of a communication network according to one embodiment of the present disclosure. The communication node upgrade system 100 includes a communication node upgrade computing system 102 that stores a communication node upgrade engine 104 and a data source 106. As will be described in detail herein below, the engine 104 performs a software upgrade on an existing VM 110' that is implemented as a communication node 112 of a communication network 114 by instantiating a new VM 110", installing the upgraded software 116 to the new VM 110", copying configuration information 118 from the existing VM 110' to the new VM 110", and replacing operation of the existing VM 110' with the new VM 110" in the communication network 114.

Within the present disclosure, the term 'upgraded software' can be construed to mean any type, version or functional (configuration) alteration of software that is different from any existing software on the existing VM 110'. For example, the upgraded software may include an older or newer version of the software currently installed on the existing VM 110', or may include a configuration or other alteration of the software. As another example, the upgraded software may include a different brand or make of software than the currently installed software, such as one that which may be provided by a different software vendor.

The data communication network 114 includes any type of data network having multiple communication nodes (communication nodes) for conveying communication services (e.g., routes, paths, etc.) through the data communication network 114. For example, the communication network 114 may be an Internet Protocol (IP) based communication network, such as a 'tier 1' communication network that provides varying types of communication services (e.g., voice, data, and video communication services, etc.). The communication network 114 provides multiple communication services for users using the communication nodes 112 that convey or otherwise relay data traffic from one communication node to another communication node 112 using one or more intermediary communication nodes 112. The communication network 114 is typically provided by a network provider that purchases, leases, or otherwise obtains communication nodes that may be configured over a geographical region for providing one or more communication services for their customers. Communication services that may be provided include, for example, voice communication services, data communication services (e.g., Internet, e-mail messaging, etc.), and video communication services (e.g., multimedia messaging services (MMS), digital video broadcast services (DVB), etc.).

Each communication node 112 may include varying types of network elements having various purposes and responsibilities in the communication network 114. For example, the communication nodes 112 may include packet switches or packet routers that route communication services between two or more communication nodes. Other types of communication nodes 112 may include gateway devices each having a first interface that communicates according to a first protocol, and a second interface that communicates according to a second protocol, such as one that interfaces a data communication network (e.g., the Internet) with a public switched telephone network (PSTN). A typical gateway may have many interfaces communicating over the same and/or different protocols. The gateway device may be, for example, an ingress network element and/or egress network element that that receives packets from or transmits packet to, respectively, a customer communication device.

The communication nodes 112 may communicate with one another in any suitable manner, such as using wireless, wired, and/or optical communications. In one embodiment, the communication nodes 112 communicates with one another using a communication network, such as the Internet, an intranet, or another wired and/or wireless communication network. In another embodiment, the communication nodes 112 communicate with one another using any suitable protocol or messaging scheme. For example, they may communicate using a Hypertext Transfer Protocol (HTTP), extensible markup language (XML), extensible hypertext markup language (XHTML), or a Wireless Application Protocol (WAP) protocol, Session Initiation Protocol (SIP), Web Real-Time Communication (WebRTC). Other examples of communication protocols exist. For example, the communication nodes 112 may communicate with one another without the use of a separate and a distinct network. Additionally, other embodiments contemplate that the modules employed by the communication nodes 112.

According to one aspect of the present disclosure, any of the communication node types described above may be implemented on a VM 110 of a virtualized computing environment 120. The structure and operation of the communication nodes 112 implemented on VMs 110 of a virtualized computing environment 120 will be described in detail below with respect to FIG. 2.

Embodiments of the present disclosure may provide certain advantages not heretofore recognized by conventional software upgrade systems for communication nodes of a communication network. For example, many conventional software upgrade systems for communication nodes often required migration of communication services from the node to be upgraded so that it could be removed from service for installing new software. Nevertheless, this technique requires the use of additional resource capacity which can be costly to use and maintain. Additionally, compatibility issues may arise with temporary resources that may not be able to handle the various nuances associated the communication services that it is intended to temporarily handle. Embodiments of the present disclosure provide solutions to these problems, among other problems, by generating a new VM, and installing the upgraded software in the new VM that mirrors the operation of an existing VM to be upgraded so that communication services may be conveniently migrated from the existing VM to the new VM in a manner that may reduce downtime for the operation of that VM.

The data source 106 stores software version association records 122 that may be used by the engine 104 to determine a particular version of upgraded software 116 that may be installed on the new VM 110". For example, when the engine 104 receives a request to upgrade a particular VM with a certain type of software, it may access the existing VM 110' to determine versioning information for that same type of software or other implementations of software executed on the existing VM 110' and select one version from among multiple versions of a particular type of according to its compatibility with the other. Additionally, the software version association records may also include information associated with any user-specified directives associated with the migration of certain software platforms to other platforms. For example, the software version association records 122 may include instructions to migrate OS layer software from a first software vendor to that provided by another software vendor.

Figure 2:
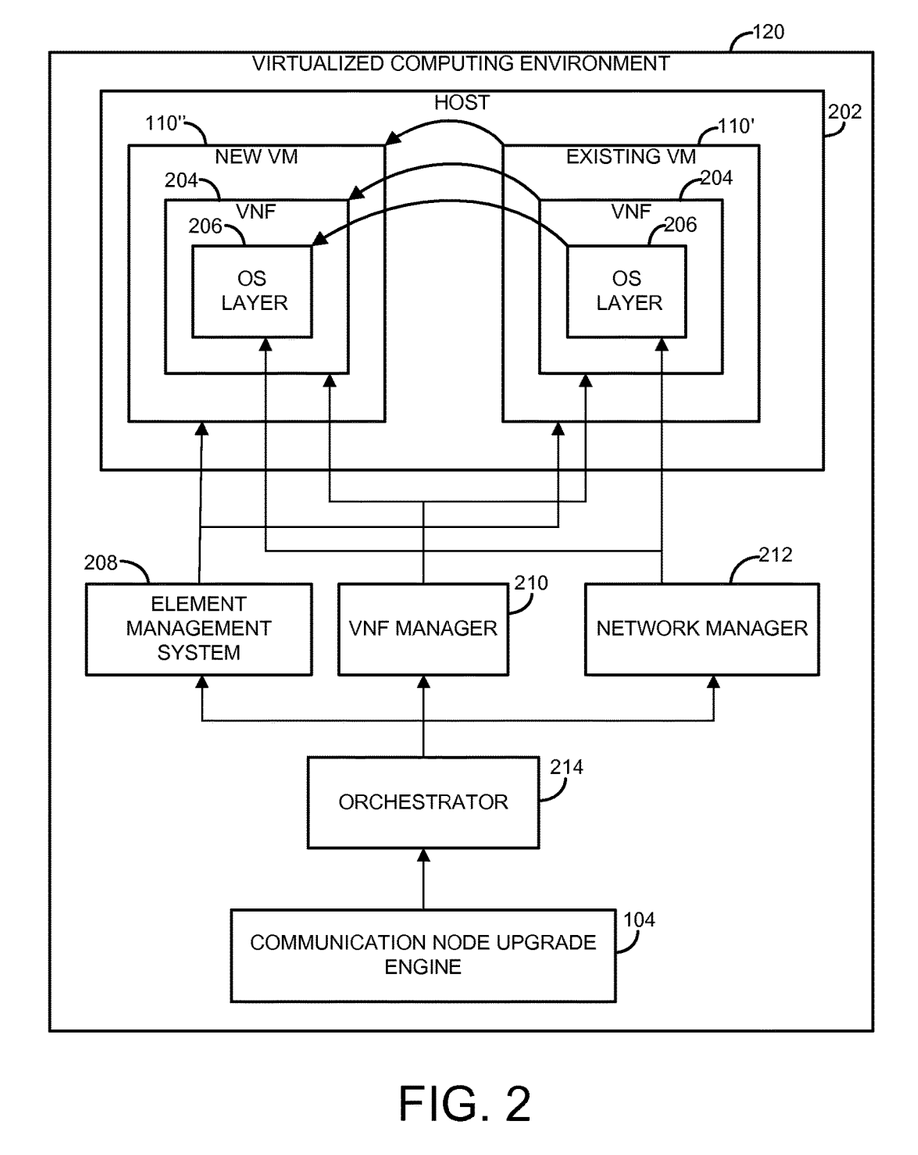
FIG. 2 illustrates an example virtualized computing environment that may generate virtual machines emulating a communication node of a communication network according to one embodiment of the present disclosure.

FIG. 2 illustrates an example virtualized computing environment 120 that may be used by the communication node upgrade system 100 according to one embodiment of the present disclosure. In general, the virtualized computing environment 120 may include at least one physical host (e.g., blade computing devices) 202 that each executes one or more virtual objects commonly referred to as virtual machines (VMs). The virtualized computing environment 120 may include any type of hosts (e.g., a computer cluster, a computing grid, a blade array, etc.) that includes any type and number of computing devices. Examples of such computing devices may include, for example, laptop or notebook computers, workstations, tablet computers, and the like, and/or complex computing structures, such as clusters, unified computing systems, fabric-based computing systems, and dynamic infrastructures. The virtualized computing environment 120 may also include other communication devices, such as switches, routers, firewall appliances, or other communication device that facilitates communication among multiple other computing devices. The virtualized computing environment 120 may also include distributed computing systems, such as storage arrays, network resource, compute devices, and/or any combination thereof.

The virtualized computing environment 120 may be any type having one or more hosts 202 that each executes one or more VMs 110. In this disclosure, the term 'host' may be interpreted as any physical device and/or component that executes and supports the operation of the VMs 110. Although only one host 202 is displayed, it should be understood that the virtualized computing environment 120 may include any quantity of hosts 202. Each host 202 includes one or more processors that execute instructions stored in at least one memory for implementing the various features described herein.

In general, the VMs 110 include various software elements that function as a communication node 112 of the communication network 114. In one embodiment, the software elements include a virtualized network function (VNF) 204 and an operating system (OS) layer 206 that implement a communication node 112 on each VM 110 according to a Telecommunications Management Network (TMN) model of the ITU Telecommunications standardization sector (ITU-T) architecture definition. Nevertheless, any suitable type of software elements for implementing a communication node on each VM 110 may be used without departing from the spirit or scope of the present disclosure.

Each VM 110 runs on top of a hypervisor that provides a virtual platform for each VM's operation and controls various aspects of its operation. One example of a suitable hypervisor includes the VMware ESX™ software suite that is available from VMware Corporation, which is located in Palo Alto, Calif. Another example of a suitable hypervisor includes a Kernel-based Virtual Machine™ (KVM) virtualization structure provided by the Open Virtualization Alliance (OVA). The KVM includes open-source software that allows kernels of certain operating systems (e.g., Linux, Unix, etc.) to function as hypervisors and supports a relatively large number of guest operating systems, such as Solaris™, Windows™, ReactOS™' Linux™, Unix™, FreeBSD™, and the like.

Each VM 110 may be managed by an element management system 208 (a.k.a. Orchestration System) used to instantiate a new VM, such as the new VM 110" and/or manage existing VMs 110, such as modifying and deleting existing VMs, such as the existing VM 110' as shown in FIG. 2.

The VNF 204 may implement any suitable communication device, such as router, switch, a firewall, malware detection device, an accelerator, a session border controller (SBC), or a load balancer. The VNF 204 may be managed by a VNF manager 210. In one embodiment, the VNF manager 210 controls the operation of the VNF 204 of each VM 110 according to a Network functions virtualization management and orchestration (NFV-MANO) Architectural Framework. For example, the VNF manager 210 manages the operation of the VNF 204 according to the network management level (layer 2) of the TMN model.

Each communication session may be based upon a contractual agreement established between the customer and customer service provider indicating what level of communication services are to be provided. In general, a contractual agreement between the service provider that manages the communication node upgrade computing system 102 and a customer of the communication network specifies what services are to be provided and any performance levels associated with these services. For example, the service provider may offer multiple service plans that each provides differing combinations and levels of communication services, such as voice communication services, video communication services, and/or data communication services, such as short messaging services (SMS), multimedia messaging services (MMS), and the like. Additionally, the service plans offered by the service provider may specify varying performance levels associated with each communication service, such as quality of service (QoS) levels, grade of service (GoS) levels, and/or terms of service (ToS) levels.

Each of the element management system 208, the VNF manager 210, and the network manager 212 may be controlled by an orchestrator 214. One example of a suitable type of orchestrator 214 includes a Cisco Intelligent Automation For Cloud (CIAC) software suite available from Cisco Corporation in San Jose, Calif. In one embodiment, the upgrade engine 104 communicates with the orchestrator 214 to facilitate the instantiation of the new VM 110", the copying of configuration information (e.g., information associated with any configuration setting of the VNF 204 and OS layer 206) from the existing VM 110' to the new VM 110", and migrating the communication services provided by the existing VM 110' to the new VM 110" as will be described in detail herein below.

Although FIG. 2 illustrates on example of a virtualized computing environment that may be used to provide upgrades for a communication node of a communication network, it is contemplated that the virtualized computing environment may be embodied in other specific forms without deviating from the spirit and scope of the present disclosure. For example, in certain cases, the VNF 204 may be void of an OS layer 206, such as when the VNF 204 includes proprietary software and/or embedded software code that may be used to boot the VM 110 and perform the various functions of the VNF 204 described herein without the use of an OS layer.

Figure 3:
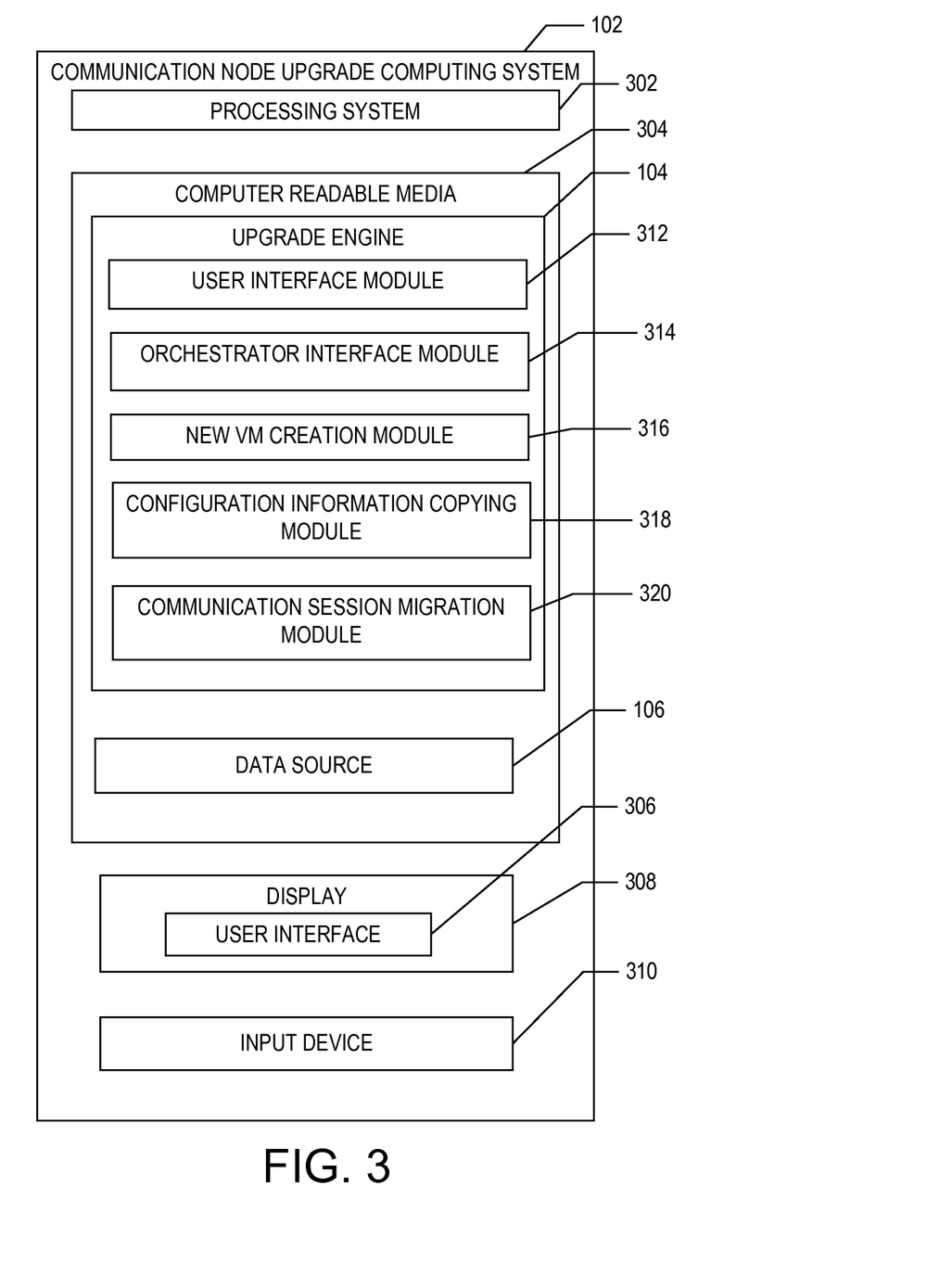
FIG. 3 depicts a diagram of an example communication node upgrade computing system according to one embodiment of the present disclosure.

FIG. 3 is a block diagram depicting an example communication node upgrade engine 104 executed on the communication node upgrade computing system 102 according to one embodiment of the present disclosure. The communication node upgrade computing system 102 includes a processing system 302 that includes one or more processors or other processing devices. A processor is hardware. Examples of such a computing system include one or more servers, personal computers, mobile computers and/or other mobile devices, and other computing devices. The communication node upgrade computing system 102 may communicate with the NEs via wireless, wired, and/or optical communications.

According to one aspect, the communication node upgrade computing system 102 includes a non-transitory computer-readable media 304 on which the engine 104 and data source 106 are stored. The engine 104 includes instructions or modules that are executable by the processing system 302 to perform the features of the communication node upgrade system 100 described herein.

The computer-readable media 304 may include volatile media, nonvolatile media, removable media, non-removable media, and/or another available media that can be accessed by the Communication node upgrade computing system 102. By way of example and not limitation, computer-readable media 304 comprises computer storage media and communication media. Computer storage media includes non-transient storage memory/media, volatile media, non-volatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

According to one aspect, the computing system 102 may include a user interface 306 displayed on a display 308, such as a computer monitor, for displaying data. The computing system 102 may also include an input device 310, such as a keyboard or a pointing device (e.g., a mouse, trackball, pen, or touch screen) to enter data into or interact with the user interface 306. According to one aspect, the engine 104 includes instructions or modules that are executable by the processing system 302 as will be described in detail herein below.

A user interface module 312 facilitates the receipt of input data and/or output data from or to a user, respectively, for manipulating the operation of the system 100. In one example, the user interface module 312 may receive user input for requesting an upgrade to a specified VM 110, receiving information for how the software upgrade is to be conducted, and/or receiving information for customizing the software upgrade to the new VM. In another example, the user interface module 312 may display information for the user, such as whether or not the software upgrade process completed successfully, any error or warning messages associated with an ongoing software upgrade process, and/or instructions to be manually performed by the user, such as requesting the insertion of a particular type of storage media (e.g., software disk) by the user.

An orchestrator interface module 314 communicates with the orchestrator 214 to control the operation of the VMs 110 and any software elements executed on the VMs 110 for implementing communication nodes 112 of the virtualized computing environment 120. For example, the orchestrator interface module 314 may communicate with the orchestrator 214 for creating the new VM 110" and/or deleting the existing VM 110' via the element management system 208. The orchestrator interface module 314 may communicate with the orchestrator 214 in any suitable manner. For example, the engine 104 may be implemented as a modular software component (e.g., a plug-in, an add-on, an extension, etc.) that may be deployed independently of the orchestrator 214 in which the orchestrator 214 includes an application program interface (API) specifically designed to communicate with the orchestrator interface module 314 via the modular software component. In another example, the orchestrator interface module 314 may communicate with the orchestrator 214 using a suitable communication link (e.g., TCP/IP, RS232, etc.) that provides for control over certain operations of the orchestrator 214. Although the present example describes an orchestrator interface module 314 that is used to communicate with the element management system 208, VNF manager 210, and network manager 212 through an orchestrator 214, other embodiments contemplate that the upgrade engine 104 may communicate directly with the element management system 208, VNF manager 210, and/or network manager 212 to upgrade the existing VM 110' to a new VM 110" without the use of a orchestrator 214.

A new VM creation module 316 manages the creation of a new VM on which the upgraded software 116 may be installed. For example, the new VM creation module 316 may communicate with the element management system 208 to create the new VM 110" via the orchestrator 214.

A configuration information copying module 318 communicates with the element management system 208, VNF manager 210 and the network manager 212 to copy configuration information from the existing VM 110' to the new VM 110". For example, the configuration information copying module 318 may communicate with the orchestrator 214 to gather configuration information from the existing VM 110' to mirror its configuration on the new VM 110". The configuration information copying module 318 may also communicate with the orchestrator 214 to gather configuration information from the VNF 204 and the OS layer 206 of the existing VM 110', and transmit the configuration information to the new VM 110" for instantiation of a new mirrored VNF 204 and a new OS layer 206 on the new VM 110".

A communication session migration module 320 manages the migration of communication services from the existing VM 110' to the new VM 110". For example, the communication session migration module 320 may communicate with the orchestrator 214 to manage deleting existing routes in the existing VM 110' and replacing those communication services inside the existing VM 110'. In one embodiment, the communication session migration module 320 communicates with the orchestrator 214 to inhibit the generation of any additional communication services in the existing VM 110', and commence implementing those additional communication services in the new VM 110" once the configuration information has been successfully copied to the new VM 110". In this manner, the interruption (e.g., down time) of communication services may be reduced or eliminated by not requiring the switchover of any existing communication services from the existing VM 110' to the new VM 110" while they are still active in some embodiments.

It should be appreciated that the modules described herein are provided only as an example of a computing device that may execute the communication node upgrade engine 104 according to the teachings of the present disclosure, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as one of the VMs 110 of the virtualized computing environment 120.

Figure 4:
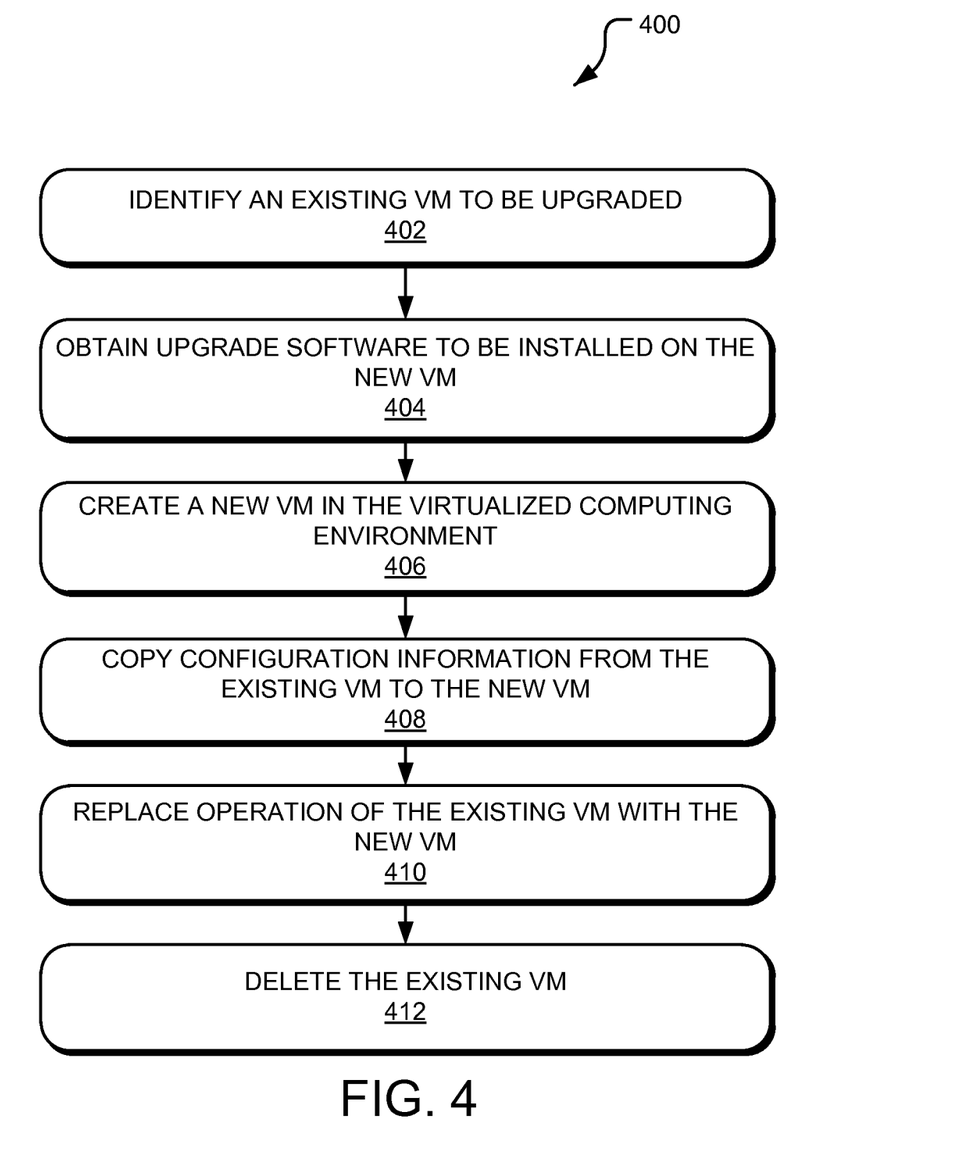
FIG. 4 is a flowchart depicting an example process that may be performed by the communication node upgrade system according to one embodiment of the present disclosure.

FIG. 4 illustrates an example process that may be performed by the communication node upgrade engine 104 according to the teachings of the present disclosure.

In step 402, the engine 104 identifies an existing VM to be upgraded. For example, the engine 104 may identify an existing VM to be upgrade according to a request received from the user interface 306 via manual entry by a user. As another example, the engine 104 may identify an existing VM to be upgraded from a request issued from another executable process, such as the orchestrator 214 that requests the upgrade due to some triggering mechanism. Examples of triggering mechanisms may include the availability of a new software version for a certain VM, VNF, or OS layer, a network capacity that goes below a specified level, scheduled periodic maintenance to be conducted on a certain group of VMs, and the like.

In step 404, the engine 104 obtains upgraded software for the identified existing VM. For example, the upgraded software or a pointer to where the upgraded software exists may be included as part of the request received in step 402. As another example, the engine 104 may obtain the upgraded software by accessing the software version association records 122 to determine what version of software to obtain as well as the location of that version of software. For example, when the engine 104 receives a request to upgrade a particular VM with a new OS layer software, it may access the existing VM 110' to determine versioning information for the VM and VNF executed on the existing VM 110' and select one version of OS layer software from among multiple available versions according to its compatibility with the VM and VNF software, or according to any user-specified directives associated with the migration of certain software platforms to other platforms (e.g., user-supplied instructions to migrate an OS layer software from a first software vendor to that provided by another software vendor).

In step 406, the engine 104 creates a new VM 110" in the virtualized computing environment 120. The new VM 110" may be created on the same host on which the existing VM 110' is executed or on a different host from which the existing VM 110' is executed. Additionally, the engine 104 may determine a particular host or type of VM to be created. For example, the engine 104 may include logic to select a particular type of new VM 110" according to certain criteria included in the request. For example, when the request includes identification of a certain VNF 204 to be upgraded, the engine 104 may determine a particular type of VM to be created based upon that version of VNF 204 to be upgraded. Alternatively, the engine 104 may create the new VM 110" as specified in the request received in step 402. For example, the request may include instructions to create the new VM 110" with a particular type of operating system (e.g., Debian Linux, version 7.0.2) on a particular host different from the host used to execute the existing VM 110'.

In step 408, the engine 104 copies configuration information from the existing VM 110' to that of the new VM 110". The configuration information includes any type of information associated with operation of the existing VM 110' in the virtualized computing environment 120, such as routing information, call session maintenance information, failover protection schemes, and the like. In one embodiment, the configuration information may include that associated with a VNF 204 and/or OS layer 206 executed on the existing VM 110' according to the TMN model section of the ITU-T architecture definition. For example, the engine 104 may utilize a backup function provided by the VNF 204 and/or OS layer 206 to obtain the configuration from the existing VM 110' and a restore function provided on a newly instantiated VNF 204 and/or OS layer 206 on the new VM 110".

In step 410, the engine 104 replaces operation of the existing VM 110' with that of the new VM 110" in the virtualized computing environment 120. In one embodiment, once the copying of the configuration information from the existing VM 110' to the new VM 110" has been completed, the engine 104 may allow existing communication services to remain active on the existing VM 110', but inhibit any new communication services from being established in the existing VM 110', and establishing those new communication services on the new VM 110".

In step 412, the engine 104 deletes the existing VM 110' from the virtualized computing environment 120. In one embodiment, the engine 104 deletes the existing VM 110' when all communication services (e.g., communication sessions) have been completed (e.g., terminated). In another embodiment, the engine 104 may generate a message to the user interface 306 informing the user that all communication traffic has ended on the existing VM 110' and wait for user input to delete the existing VM 110'.

The process may be continued at step 402 for upgrading of other VMs with new software. Nevertheless, when use of the engine 104 is no longer needed or desired, the process ends.

It should be appreciated that the process described herein is provided only as an example and that the communication node upgrade system 100 may execute additional steps, fewer steps, or differing steps than those described herein. For example, the steps 402 through 412 may be executed in any suitable order; that is, the steps as described in FIG. 4 are not limited to execution in any particular sequence. As another example, either of the steps 402 through 412 described herein may be executed by the upgrade computing system 102 or may alternatively be performed by another computing system without departing from the spirit or scope of the present disclosure.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 5:
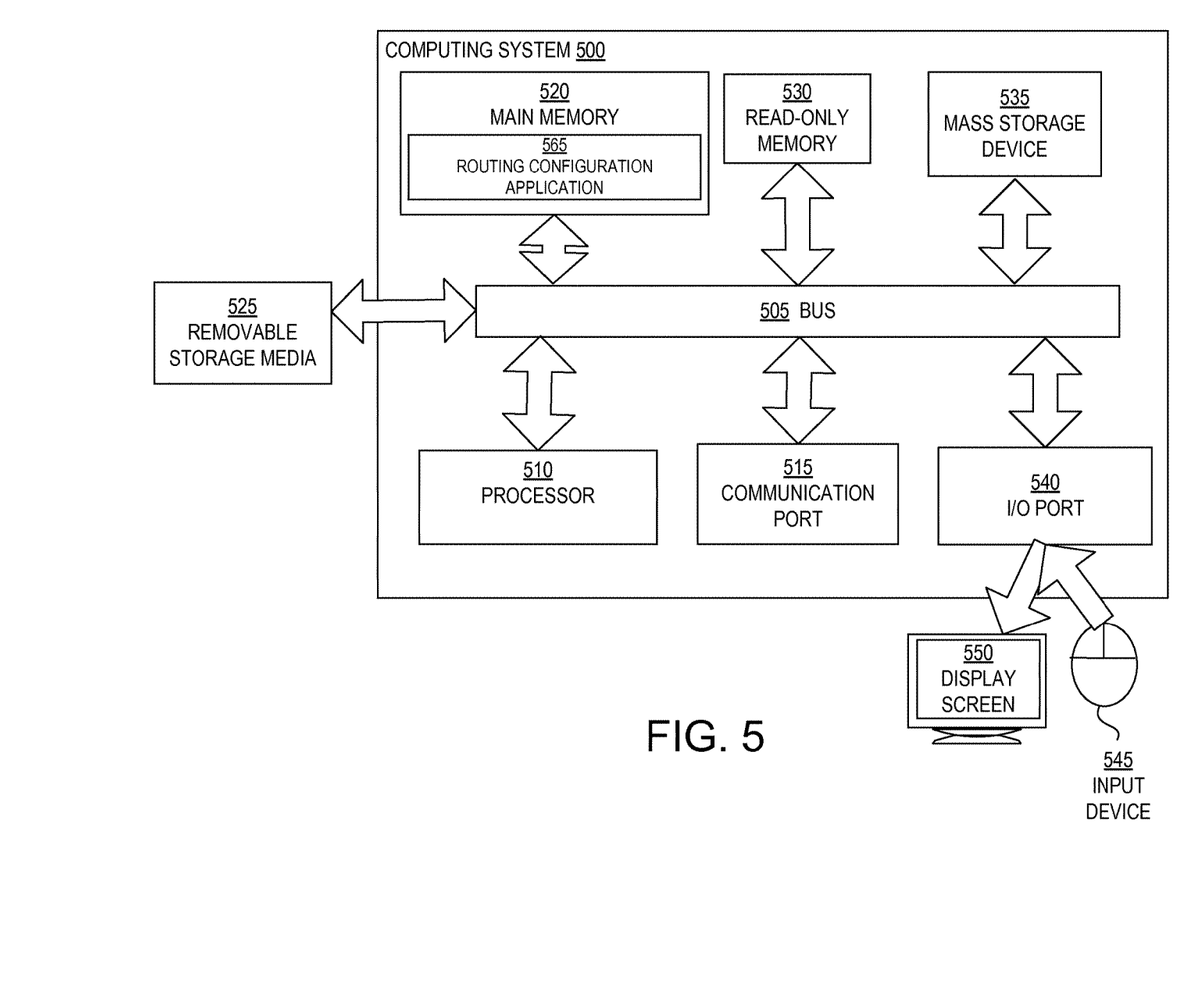
FIG. 5 illustrates an example computer system according to one embodiment of the present disclosure.

For example, FIG. 5 is a block diagram illustrating an example of a host or computer system 500 which may be used in implementing the embodiments of the present disclosure. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 513 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 530, as illustrated.

I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A computer readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., hard disk drive); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A communication node upgrade system comprising:
  a computing system comprising at least one processing system and at least one memory for storing instructions that are executed by the at least one processing system to:
    identify an existing virtual machine (VM) to be upgraded, the existing VM comprising at least one communication node that provides one or more communication services for a communication network, wherein the existing VM is executed in a virtualized computing environment;
    obtain upgraded software for the existing VM;
    create a new VM in the virtualized computing environment using the upgraded software;
    copy configuration information from the existing VM to the new VM, the configuration information including information associated with configuration of the existing VM to provide the communication services by the existing VM; and
    replace operation of the existing VM with the new VM in the communication network.

2. The communication node upgrade system of claim 1, wherein the instructions are further executed to manage operation of the existing VM and the new VM using an element management system.

3. The communication node upgrade system of claim 1, wherein the upgraded software conforms to a Telecommunications Management Network (TMN) model of an ITU Telecommunications standardization sector (ITU-T) architecture definition comprising a virtualized network function (VNF) layer and an operating system (OS) layer.

4. The communication node upgrade system of claim 3, wherein the instructions are further executed to manage operation of the VNF layer of the existing VM and the new VM using a VNF manager that copies the configuration information from the VNF layer of the existing VM to the VNF layer of the new VM.

5. The communication node upgrade system of claim 3, wherein the instructions are further executed to manage operation of the OS layer of the existing VM and the new VM using a network manager that copies the configuration information from the OS layer of the existing VM to the OS layer of the new VM.

6. The communication node upgrade system of claim 3, wherein the instructions are further executed to, when the configuration information has been copied from the existing VM to the new VM, inhibit new communication services on the existing VM and establish the new communication services on the new VM.

7. The communication node upgrade system of claim 1, wherein the instructions are further executed to delete the existing VM from the virtualized computing environment when all existing communication services have expired.

8. The communication node upgrade system of claim 1, wherein the instructions are further executed to communicate with the existing VM and the new VM using an orchestrator that manages operation of the virtualized computing environment.

9. The communication node upgrade system of claim 1, wherein the instructions are further executed to obtain a specified version of the upgraded software according to a compatibility of the upgraded software with the new VM.

10. A communication node upgrade method comprising:
identifying, using instructions stored on at least one computer-readable medium and executed by at least one processor, an existing virtual machine (VM) to be upgraded, the existing VM comprising at least one communication node that provides one or more communication services for a communication network, wherein the existing VM is executed in a virtualized computing environment;
obtaining, using the instructions, upgraded software for the existing VM;
creating, using the instructions, a new VM in the virtualized computing environment using the upgraded software;
copying, using the instructions, configuration information from the existing VM to the new VM, the configuration information including information associated with configuration of the existing VM to provide the communication services by the existing VM; and
replacing, using the instructions, operation of the existing VM with the new VM in the communication network.

11. The communication node upgrade method of claim 10, further comprising managing operation of the existing VM and the new VM using an element management system.

12. The communication node upgrade method of claim 10, wherein the upgraded software conforms to a Telecommunications Management Network (TMN) model of an ITU Telecommunications standardization sector (ITU-T) architecture definition comprising a virtualized network function (VNF) layer and an operating system (OS) layer.

13. The communication node upgrade method of claim 12, further comprising managing operation of the VNF layer of the existing VM and the new VM using a VNF manager.

14. The communication node upgrade method of claim 12, further comprising managing operation of the OS layer of the existing VM and the new VM using an orchestration system.

15. The communication node upgrade method of claim 12, further comprising, when the configuration information has been copied from the existing VM to the new VM, inhibiting new communication services on the existing VM and establish the new communication services on the new VM.

16. The communication node upgrade method of claim 10, further comprising deleting the existing VM from the virtualized computing environment when all existing communication services have expired.

17. The communication node upgrade method of claim 10, further comprising obtaining a specified version of the upgraded software according to a compatibility of the upgraded software with the new VM.

18. A non-transitory computer-readable medium encoded with a route monitoring service comprising instructions executable by a processor to:
identifying an existing virtual machine (VM) to be upgraded, the existing VM comprising at least one communication node that provides one or more communication services for a communication network, wherein the existing VM is executed in a virtualized computing environment;
obtaining upgraded software for the existing VM;
creating a new VM in the virtualized computing environment using the upgraded software;
copying configuration information from the existing VM to the new VM, the configuration information including information associated with configuration of the existing VM to provide the communication services by the existing VM; and
replacing operation of the existing VM with the new VM in the communication network.

19. The non-transitory computer-readable medium of claim 18, including instructions that are executed to manage operation of the existing VM and the new VM using an element management system.

20. The non-transitory computer-readable medium of claim 18, wherein the upgraded software conforms to a Telecommunications Management Network (TMN) model of an ITU Telecommunications standardization sector (ITU-T) architecture definition comprising a virtualized network function (VNF) layer and an operating system (OS) layer.

* * * * *